E. Parker.

Knob Attachment.

No. 3,720. Reissued Nov. 9, 1869.

Witnesses
Alf. A. Robinson
Jeremy W. Bligh

Inventor
Emery Parker

N. PETERS, PHOTO-LITHOGRAPHER, WASHINGTON, D. C.

United States Patent Office.

EMERY PARKER, OF NEW BRITAIN, CONNECTICUT.

*Letters Patent No.* 38,406, *dated May* 5, 1863; *reissue No.* 1,707, *dated June* 21, 1864; *reissue No.* 3,720, *dated November* 9, 1869.

IMPROVEMENT IN ATTACHING KNOBS TO THEIR SPINDLES.

The Schedule referred to in these Letters Patent and making part of the same.

*To all whom it may concern:*

Be it known that I, EMERY PARKER, formerly of Meriden, but now of New Britain, in the county of Hartford, and State of Connecticut, have invented a new and useful Improvement in Door-Knobs; and I do hereby declare that the following specification, taken in connection with the drawings, making a part of the same, is a full, clear, and exact description thereof.

Figure 1:
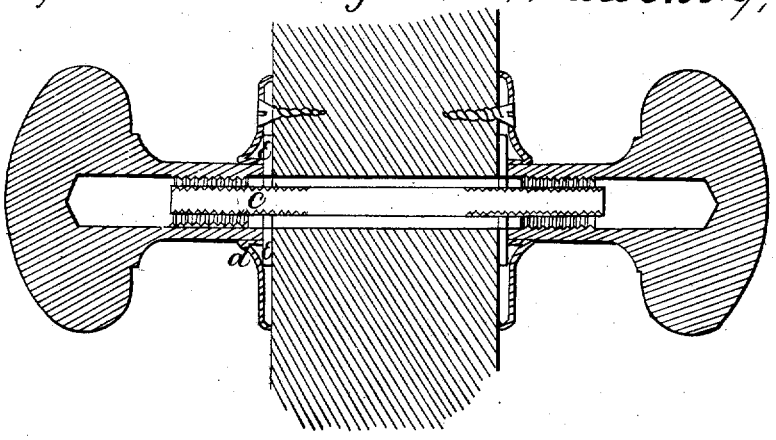
Figure 1 is a sectional view through the axis of the knob and spindle, and shows also the relation of the parts when applied to the door.
Figure 2:
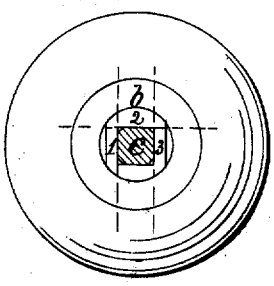
Figure 2 is a transverse section, showing the shank of the knob, the spindle, and the device for securing the same in place.

My invention consists in the peculiar means by which the knob is held fast on the spindle after it has been adjusted in place.

In the drawings—

C is a square spindle, upon whose four corners a screw-thread is cut, and the knob used therewith is tapped with a female screw in the usual manner.

Figure 3:
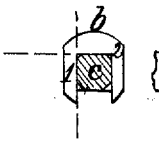
Figure 3 is a transverse section through the spindle and the holding-device.
Figure 4:
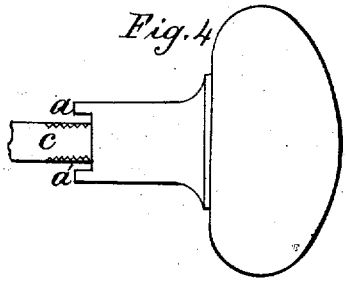
Figure 4 is a side view of one of the knobs.
Figure 5:
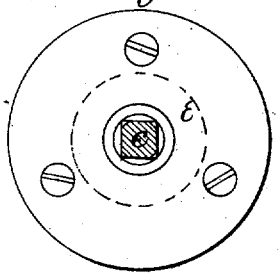
Figure 5 shows, in section, the outer escutcheon-plate or "rose," with the inner or independent rose, to be hereafter referred to, indicated by dotted lines.

The face of the shank of the knob is partially cut in, as shown at *a*, fig. 4, to receive the holding-device or straddle-key *b*, fig. 3.

This straddle-key is provided with two prongs or fingers, fitted to embrace two flat sides of the spindle; its upper end is fitted to recess *a*, cut in the end of the knob-shank. It is obvious, that when thus adjusted, the knob is prevented from rotating upon the spindle, and held securely in place.

To prevent this key from becoming dislodged, the outer rose, sometimes called the knob-escutcheon, is struck up or raised, as seen at *d*, fig. 1, so as to cover such key and hold it in place.

The advantages of this means of securing the knobs to the spindles are, that their adjustment, with reference to the thickness of the door, can be made within a distance equal to one quarter of the pitch of the thread, and also the employment of the exposed holding-screw or pin commonly employed, and so liable to work out of place, is avoided.

What I claim as my invention, and desire to secure by Letters Patent, is—

The combination of a screw-threaded knob and spindle, with the straddle-key, let into the end of the knob-shank, and held in place by the escutcheon-plate, substantially as shown and described.

Witnesses: EMERY PARKER.

L. WOODRUFF,

M. S. WIARD.